US009008209B2

United States Patent
Liu et al.

(10) Patent No.: US 9,008,209 B2
(45) Date of Patent: Apr. 14, 2015

(54) METHOD IN A WIRELESS COMMUNICATION SYSTEM

(71) Applicant: Huawei Technologies Co., Ltd., Shenzhen (CN)

(72) Inventors: Jianghua Liu, Beijing (CN); Anahid Robert Safavi, Kista (SE)

(73) Assignee: Huawei Techonlogies Co., Ltd., Shenzhen (CN)

( * ) Notice: Subject to any disclaimer, the term of this patent is extended or adjusted under 35 U.S.C. 154(b) by 0 days.

(21) Appl. No.: 14/042,429

(22) Filed: Sep. 30, 2013

(65) Prior Publication Data

US 2014/0029689 A1     Jan. 30, 2014

Related U.S. Application Data

(63) Continuation of application No. PCT/CN2011/072349, filed on Mar. 31, 2011.

(51) Int. Cl.
*H04B 7/02*          (2006.01)
*H04B 7/04*          (2006.01)
(Continued)

(52) U.S. Cl.
CPC ............ *H04B 7/0456* (2013.01); *H04B 7/0486* (2013.01); *H04B 7/0469* (2013.01); *H04B 7/063* (2013.01); *H04B 7/0632* (2013.01); *H04L 5/0023* (2013.01); *H04L 5/0035* (2013.01);
(Continued)

(58) Field of Classification Search
USPC .......... 375/267, 299, 347, 349; 455/101, 102, 455/132, 103
See application file for complete search history.

(56) References Cited

U.S. PATENT DOCUMENTS 8,483,085 B2 *   7/2013   Pan et al. ....................... 370/252
2007/0160162 A1 *   7/2007   Kim et al. ..................... 375/267
(Continued)

FOREIGN PATENT DOCUMENTS

CN      101615937 A    12/2009
CN      101944985 A    1/2011
WO     2010105415 A1   9/2010

OTHER PUBLICATIONS

IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1, IEEE Std 802.16e-2005 and IEEE Std 802.16-2004/Cor1-2005, Feb. 28, 2006, 864 pages, New York, NY.

(Continued)

*Primary Examiner* — Rahel Guarino
(74) *Attorney, Agent, or Firm* — Slater & Matsil, L.L.P.

(57) ABSTRACT

The present invention relates to a method including signalling by a receive node at least one first transmission rank r to a transmit node, where $1 \leq r \leq R$, wherein R is a maximum available rank for a transmission, and at least one predefined precoding matrix corresponds to the first transmission rank r, determining by the transmit node a second transmission rank r' for transmitting data from the transmit node to the receive node, where $1 \leq r' \leq R$, defining at least two subsets of precoding matrices for at least one of the at least one first transmission rank r, selecting one of the at least two subsets of precoding matrices in accordance with a channel quality estimate for a radio channel, and signalling the selected one subset of precoding matrices, wherein the selected one subset of precoding matrices is associated with said the at least one predefined precoding matrix.

21 Claims, 2 Drawing Sheets

(51) Int. Cl.
*H04B 7/06* (2006.01)
*H04L 5/00* (2006.01)
*H04L 25/03* (2006.01)

(52) U.S. Cl.
CPC ............ *H04L5/0057* (2013.01); *H04L 5/0091* (2013.01); *H04L 25/03923* (2013.01); *H04L 25/03949* (2013.01)

(56) References Cited

U.S. PATENT DOCUMENTS

| | | |
|---|---|---|
| 2008/0188190 A1 | 8/2008 | Prasad et al. |
| 2009/0080549 A1 | 3/2009 | Khan et al. |
| 2009/0238298 A1 | 9/2009 | Kim et al. |
| 2010/0215110 A1 | 8/2010 | Onggosanusi et al. |
| 2010/0260243 A1 | 10/2010 | Ihm et al. |
| 2012/0224652 A1 | 9/2012 | Chen et al. |

OTHER PUBLICATIONS

International Search Report and Written Opinion of the International Searching Authority received in Patent Cooperation Treaty Application No. PCT/CN2011/072349, mailed Jan. 5, 2012, 10 pages.

* cited by examiner

*d: antenna spacing*

METHOD IN A WIRELESS COMMUNICATION SYSTEM

This application is a continuation of International Patent Application No. PCT/CN2011/072349, filed on Mar. 31, 2011, which is hereby incorporated herein by reference in its entirety.

TECHNICAL FIELD

The present invention relates to a method in a wireless communication system, and more specifically to a method in a multiple antenna wireless communication system. Furthermore, the invention also relates to a method in a receive node, a receive node device, a method in a transmit node, a transmit node device, a computer program and a computer program product.

BACKGROUND

In a wireless communication system it is well known that utilizing linear precoding at the transmitter side can improve the performance substantially when multiple antennas are used in the system. Such kind of linear precoding has been implemented in the IEEE 802.16-2005 standard and in the 3GPP Rel-8/9/10 Long Term Evolution (LTE) standard.

To support precoding at the transmitter in Downlink (DL), the receiver, also known as the User Equipment (UE), feeds back Channel State Information (CSI) about the radio channels experienced between the transmitter and receiver antennas. The CSI consists of:

Channel Quality Indicator (CQI)—the channel quality in the form of Signal to Interference and Noise Ratio (SINR) is measured by the receiver based on the received reference signals. To reduce the overhead of reporting the actual value of SINR, a set of Modulation and Coding Schemes (MCSs) is defined and the measured SINR is mapped to a MCS. Hence, only the index of the selected MCS representing the channel quality is reported to the receiver. The relation between the SINR and the selected MCS is that the Block Error Rate (BLER) of a transport block performed by such MCS does not exceed 10% assuming the transmission channel quality is the measured SINR.

A preferred precoding vector or matrix which the UE has determined based on measurement on the multi-antenna channel.

The suggested rank representing the number of transmission layers or streams that the UE has determined based on the measurement on the DL channel.

To reduce feedback overhead related to precoding vector/matrix, quantization is required as to represent the CSI in a finite number of bits. As an example, the 3GPP LTE Rel.8 standard uses a precoding matrix codebook consisting of 64 matrices for different ranks in case of four antenna ports, and the UE feeds back the preferred precoding matrix using 6 information bits instead of actual channel reporting.

In addition, the corresponding transmission rank and CQI based on the selected precoding matrix are reported as well. After receiving the reported precoding matrix, rank and CQI, the eNB will perform the scheduling for DL transmission for the UE. It should be noted that the reported precoding matrix from the UE is only a recommendation, and the eNB can override the reported one and instead use other precoding matrices which are different from the reported one.

The same principle of precoding operation is also applied in LTE Rel-10 Uplink (UL). For UL precoding, the eNB firstly utilizes the Sounding Reference Signal (SRS) transmitted from the UE to estimate the UL channel. Once the UL channel is measured the eNB can estimate SINR corresponding to the UL channel, and map the SINR to a MCS as DL CQI used for link adaptation. Once UL channel is measured, the eNB selects the rank and the corresponding most appropriate precoding matrix from a predefined codebook of 53 matrices, in the case of four antenna ports, which represent measured channel as well. Finally, the selected precoding matrix is signalled to the UE for UL precoding. The difference with DL precoding is that it is mandatory for the UE to utilize the signalled rank and precoding matrix from eNB.

It can be seen in above described procedures that the precoding matrix is selected by the receiver, and then the precoding matrix is reported or signalled to the transmitter to perform precoding. This kind of precoding operation is defined as closed loop precoding, i.e. channel dependent precoding.

It is important to notice that, for closed loop precoding, the selected precoding matrix based on the channel at time t will be used for precoding at time T (T>t) due to the processing time needed for channel measurement, precoding matrix selection and the propagation time for reporting of precoding matrix or signalling. As the channel is time varying, the selected precoding matrix at time t may be obsolete and not match the channel at time T when the channel varies fast in time such as for high mobility cases. Therefore, the MCS determined by the CQI corresponding to the reported precoding matrix at time t might not be suitable for transmission at time T, which results in performance degradation. Hence, in order to achieve closed loop precoding gain, the channel over time should vary slowly, i.e. low mobility.

As explained above, closed loop precoding is suitable for low mobility. At high mobility, the reported or signalled precoding matrix will not match the radio transmission channel because of channel variation and therefore the performance will be degraded due to this mismatch on chosen precoding vector. However, high mobility is a common scenario in real life, e.g. the communication in the train, car, etc. which must be considered.

In LTE Rel-8, an open loop precoding scheme (DL transmission mode 3) is defined for high mobility scenarios. Major differences between closed loop and open loop schemes are that in an open loop scheme the used precoding matrices are predefined, and further there is no Precoding Matrix (PMI) selection. As both eNB and UE know the predefined precoding matrices, the UE only feeds back average CQI and selected rank as CSI information. In the case of open loop precoding this CQI corresponds to an average CQI. Average CQI over the channel is computed by averaging CQI over a set of the predefined precoders known both at UE and eNB side. More precisely, open loop precoding of Rel-8 uses transmit diversity scheme (TxD) when the transmission rank is 1, otherwise, it uses large delay CDD (Cyclic Delay Diversity) precoding.

For large delay CDD, precoding is defined by:

$$\begin{bmatrix} z^{(0)}(i) \\ z^{(1)}(i) \\ \vdots \\ z^{(P-1)}(i) \end{bmatrix} = W(i)D(i)U \begin{bmatrix} x^{(0)}(i) \\ x^{(1)}(i) \\ \vdots \\ x^{(v-1)}(i) \end{bmatrix}$$

Where P denotes the number of antenna ports, v denotes transmission rank or layers, $[x^{(0)}(i) \, x^{(1)}(i) \ldots x^{(v-1)}(i)]^T$ represents the block of data vectors with multiple layers and $[z^{(0)}(i)\ z^{(1)}(i)\ \ldots\ z^{(P-1)}(i)]^T$ is the block of vectors to be mapped on resources on each of the antenna ports. The precoding matrix W is of size P×v and i=0, 1, ..., M with M being the number of modulation symbol per layer. The matrix D(i) is supporting cyclic delay diversity the matrix U is of size v×v. These matrices are specified and are given for different number of layers v.

In the case of 4 antenna ports, the UE assumes that the eNB cyclically assigns different precoders to different vectors, i.e. $[x^{(0)}(i)\ x^{(1)}(i)\ \ldots\ x^{(v-1)}(i)]^T$, on Physical Downlink Shared Data Channel (PDSCH). A different precoder is used every v vectors. Different precoders are selected from a given table in the specification. Due to precoder cycling, several precoding matrices are used in one Resource Block (RB).

The precoding cycling can achieve an average CQI over four different channels because the four precoding matrices represent four different channels. The averaged CQI is more robust to channel variation than that of closed loop precoding.

A drawback of this scheme is that only one set of four precoding matrices is defined for each rank which is not adapted to different scenarios in practical system. For example, different antenna setups including Uniform Linear Array (ULA) and cross-polarization are deployed in practice, which requires different precoding matrices to match the antenna configuration structure. Moreover, different precoding matrices are needed for the case with/without antenna gain imbalance in uplink due to hand griping. Furthermore, the large delay CDD precoding with precoding cycling can not preserve single carrier property and therefore, is not suitable for the case of LTE UL.

Another prior art is related to Coordinated Multipoint (CoMP) transmission. For CoMP, there are multiple sites and a number of antennas are deployed at each site. For DL transmission, several or all the sites are coordinated together to transmit PDSCH to a certain UE. The PDSCH is transmitted over all the available antennas from the coordinated sites by means of precoding. As the distance between each site and a certain UE is different, the path loss is different and subsets of precoding matrices are predefined corresponding to different path losses.

According to the path loss measurement from the UE, the eNB will select the sites for coordination transmission and determine a subset of precoding matrices for precoding operation from the selected coordination sites. After selection, the determined sites and the subset of precoding matrices are signalled to the UE. Then the UE will follow the procedure as described for closed loop above, i.e. selecting the preferred precoding matrix from the signalled subset and reporting it to the eNB.

It can be seen that the precoding procedure of this prior art is almost similar to the closed loop precoding, which is not suitable for high mobility scenarios. Also, the predefined subsets of precoding matrices are for different number of transmit antennas depending on the number of selected coordination sets. For the normal transmission without CoMP, there is only one site and the path loss is almost same for all the antennas deployed at the site, and therefore defining multiple subsets of precoding matrices corresponding to different path loss and different number of antennas is not useful.

Yet another prior art concerns open loop precoding cycling MIMO communications. According to this prior art, there are multiple subsets of precoding matrices defined for open loop MIMO; for each rank, only one subset of precoding matrix is defined. When a transmission rank is determined for data transmission, all the precoding matrices in the defined subset for such rank will be used to perform precoding cycling.

SUMMARY OF THE INVENTION

An object of the present invention is to provide a method which solves and/or mitigates the drawbacks of prior art. More specifically, an object of the present invention is to provide a method for improving precoding performance at high mobility for both uplink and downlink of wireless communication system.

According to one aspect of the invention, the objects are achieved with a method in a multiple antenna wireless communication system, said wireless communication system comprising at least one transmit node and at least one receive node, said method comprising the steps of:
  signalling by said receive node at least one first transmission rank r to said transmit node, where 1≤r≤R, wherein R is a maximum available rank for a transmission between said transmit node and said receive node, and wherein at least one predefined precoding matrix corresponds to said first transmission rank r;
  determining by said transmit node a second transmission rank r' for transmitting data from said transmit node to said receive node, where 1≤r'≤R, and comprising the further steps of:
  defining at least two subsets of precoding matrices for at least one of said at least one first transmission rank r;
  selecting one of said at least two subsets of precoding matrices based on a channel quality estimate for a radio channel between said transmit node and said receive node; and
  signalling said selected one subset of precoding matrices, wherein said selected one subset of precoding matrices is associated with said at least one predefined precoding matrix corresponding to said at least one first transmission rank r.

Different embodiments of the method above are disclosed herein.

According to another aspect of the invention, the objects are also achieved with a method in a receive node for a multiple antenna wireless communication system, said method comprising the steps of:
  signalling at least one first transmission rank r to a transmit node, where 1≤r≤R, wherein R is a maximum available rank for a transmission between said transmit node and said receive node, and wherein at least one predefined precoding matrix corresponds to said first transmission rank r; further comprising the steps of:
  defining at least two subsets of precoding matrices for at least one of said at least one first transmission rank r;
  selecting one of said at least two subsets of precoding matrices based on a channel quality estimate for a radio channel between said transmit node and said receive node; and
  signalling said selected one subset of precoding matrices to said transmit node, wherein said selected one subset of precoding matrices is associated with said at least one predefined precoding matrix corresponding to said at least one first transmission rank r.

According to yet another aspect of the invention, the objects are also achieved with a method in a transmit node for a multiple antenna wireless communication system, said method comprising the steps of:
  receiving at least one first transmission rank r signalled from a receive node, where 1≤r≤R, wherein R is a maximum available rank for a transmission between said transmit node and said receive node, and wherein at least one predefined precoding matrix corresponds to said first transmission rank r;

determining by said transmit node a second transmission rank r' for transmitting data from said transmit node to said receive node, where 1≤r'≤R, further comprising the steps of:

defining at least two subsets of precoding matrices for at least one of said at least one first transmission rank r;

selecting one of said at least two subsets of precoding matrices based on a channel quality estimate for a radio channel between said transmit node and said receive node; and signalling said selected one subset of precoding matrices to said receive node, wherein said selected one subset of precoding matrices is associated with said at least one predefined precoding matrix corresponding to said at least one first transmission rank r.

Furthermore, the invention also relates to a receive node device, a transmit node device, a computer program and a computer program product.

The present invention provides a solution which is well suited for high mobility scenarios in wireless communication systems, such as LTE systems. It has been shown that the performance of the invention is better than comparable prior art solutions such as closed loop precoding because there are at least two subsets of precoding matrix for different rank according to the invention, which makes it flexible to support reliable transmissions for different scenarios, e.g. antenna setup, antenna gain imbalance, etc. Further, the signalling of selected subset of precoding matrices can reuse current existing control channel formats and simplify control channel design.

Other applications and advantages of the present invention will be apparent from the following detailed description.

BRIEF DESCRIPTION OF THE DRAWINGS

The appended drawings are intended to clarify and explain different embodiments and aspects of the present invention in which.

DETAILED DESCRIPTION OF ILLUSTRATIVE EMBODIMENTS

Figure 1:
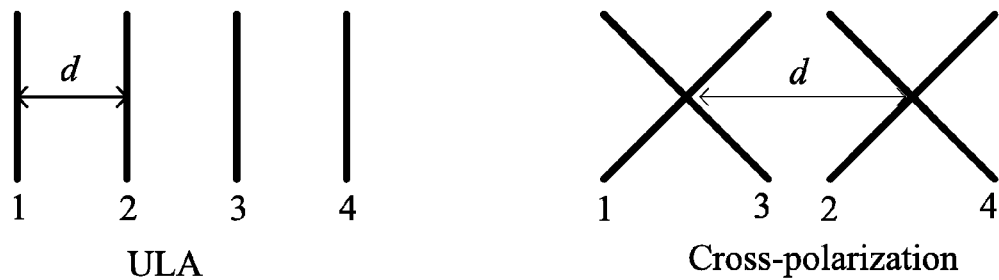
FIG. 1 illustrates different antenna configurations.

To achieve the aforementioned objectives, the present invention relates to a method in a multiple antenna wireless communication system.

The method comprises the following steps. Signalling by a receive node at least one first transmission rank r to a transmit node, where 1≤r≤R, and R is a maximum available rank for a transmission between the transmit node and the receive node. Further, at least one predefined precoding matrix corresponds to the at least one first transmission rank r which means that both the transmit node and receive node have the same assumption on the set of at least one precoding matrix used for the first transmission rank r data transmission.

Determining by the transmit node a second transmission rank r' for transmitting data from the transmit node to the receive node, where 1≤r'≤R. The second transmission rank r' is the actual rank used for the transmission of data between the nodes, i.e. the transmit node will transmit a number of r' layers of data to the receive node.

Defining at least two subsets of precoding matrices for at least one of the at least one first transmission rank r, and selecting one of the at least two subsets of precoding matrices based on a channel quality estimate for a radio channel between the transmit node and the receive node. Finally, signalling the selected one subset of precoding matrices, wherein the selected one subset of precoding matrices is associated with the at least one predefined precoding matrix corresponding to the at least one first transmission rank r.

The second transmission rank r' is always equal to the at least one first transmission rank r according to an embodiment of the invention, which means that it is mandatory for the transmit node to use the received first transmission rank r signalled from the received node for data transmission.

According to another embodiment, the second transmission rank r' is equal to or different from the at least one first transmission rank r. This embodiment implies that the transmit node can override the received first transmission rank r from the received node. When the transmit node considers that the first received transmission rank r is suitable for data transmission, it will transmit a number of r layers of data to the receive node; otherwise a number of r' (r'≠r) layers of data are transmitted to the receive node. In addition, the transmit node will use the set of precoding matrices defined for the second transmission rank r'.

As mentioned above, one subset of precoding matrices among the at least two subsets is selected based on a channel quality estimate. Preferably, the channel quality estimate is the CQI or SINR for the radio channel between the transmit node and receive node according to yet another embodiment of the invention.

The subset is preferably selected such that the average CQI or SINR for the selected one subset is higher than the average CQI or SINR for the other defined subset/subsets of precoding matrices. For example, if a plurality of subsets is defined, the selected subset of precoding matrices is the subset that gives the highest average CQI or SINR according to this embodiment of the invention.

It has been further realized by the inventors that the different subsets of precoding matrices may be determined based one or more criterions in the group comprising: antenna setup at the transmit node, antenna gain imbalance, and matrix distance metric.

As precoding matrices in a codebook is used to represent multiple antenna channels, the codebook should preferably be designed according to the property of channel which is related to antenna deployment. It is well known that there are two typical antenna configurations ULA and cross-polarization as illustrated in FIG. 1.

For ULA, more space is needed to deploy antennas compared to cross-polarization assuming the same number of antennas. Due to the limited space at eNB or UE side in practical systems, the antenna spacing d as shown in FIG. 1 needs to be reduced which results in high antenna correlation. For this case, Discrete Fourier Transform (DFT) based precoding matrices are normally applied for achieving precoding gain. For example, the first eight precoding vectors for 4TX rank 1 in LTE Rel-8 system are DFT or rotated DFT matrices.

For cross-polarization antenna configurations, the antennas with the same polarization are correlated as ULA, but the antennas from different polarization are relatively independent. According to this property, the precoding vector/matrix can be composed of two parts, wherein each part is optimized for one polarization, and the two parts corresponding to two polarizations are co-phased to achieve constructive combination. This principle is applied for the design of 8TX precoding matrices in LTE Rel-10.

Therefore, it can be seen that different kind of precoding matrices are needed for different antenna deployments. As the antenna deployment is not specified in standards and it is up to eNB or UE implementation, the codebook can not be designed only for either ULA or cross-polarization.

Hence, the codebook according to an embodiment shall not only include the precoding matrices for ULA, but also precoding matrices for cross-polarization. In practical systems, the receive node measures the channel using reference signal to identify the channel property, e.g. ULA or cross-polarization and selects the corresponding precoding matrices in the codebook.

One can therefore split the set of existing codebook covering both type of antenna polarization into at least two subsets of precoding matrices according to the invention; one subset containing ULA codebooks, and another one containing cross-polarized codebooks. Therefore, based on deployment scenario average CQI can be measured over the appropriate subset.

In addition to antenna deployment, there are also some other factors which can impact precoding matrix design. For example, antenna gain imbalance can occur in UL transmission due to hand griping. It means that the transmission from some antennas is blocked by hand and there is serious fading. Thus, it is not necessary to allocate power for these antennas and power saving can be achieved. To perform that, the elements in the precoding matrices corresponding to these antennas should be zero. This kind of precoding matrices for antenna gain imbalance is applied for Rel-10 2TX and 4TX uplink precoding, respectively, as shown in Table 1 below.

TABLE 1

Precoding matrices for antenna gain imbalance

2TX $\quad \frac{1}{\sqrt{2}}\begin{pmatrix}1\\0\end{pmatrix}, \frac{1}{\sqrt{2}}\begin{pmatrix}0\\1\end{pmatrix}$ 4TX $\quad \frac{1}{2}\begin{pmatrix}1\\0\\1\\0\end{pmatrix}, \frac{1}{2}\begin{pmatrix}1\\0\\-1\\0\end{pmatrix}, \frac{1}{2}\begin{pmatrix}1\\0\\j\\0\end{pmatrix}, \frac{1}{2}\begin{pmatrix}1\\0\\-j\\0\end{pmatrix}, \frac{1}{2}\begin{pmatrix}0\\1\\0\\1\end{pmatrix}, \frac{1}{2}\begin{pmatrix}0\\1\\0\\-1\end{pmatrix}, \frac{1}{2}\begin{pmatrix}0\\1\\0\\j\end{pmatrix}, \frac{1}{2}\begin{pmatrix}0\\1\\0\\-j\end{pmatrix}$ For 2TX, the first precoding vector is used when the second antenna has considerable loss. Otherwise the second one is used. For 4TX, the precoding vectors 1~4 are used when the second and fourth antennas are very bad or the remaining four precoding vectors are used when the first and third antenna have serious fading. In this way, half the transmission power can be saved. However, these precoding matrices are not suitable for the case without antenna gain imbalance. In other words, when the eNB measures there is antenna gain imbalance based on sounding reference signal, the eNB will select the above precoding matrices. Otherwise the eNB will use the remaining precoding matrices in the codebook. For this case, one can split the set of precoding vectors to two distinct subsets. First subset containing precoders where there is no antenna gain imbalance and the second subset containing precoders with antenna gain imbalance.

More precisely, for open loop precoding, the present invention is to define a number of M (M>1) subsets for at least one first transmission rank r, where each subset has at least one precoding matrix and at least one subset has more than one precoding matrix. The subset consisting of more than one precoding matrix is used to achieve a robust CQI at high mobility, which is averaged over the multiple precoding matrices in the subset. The definition of multiple subsets is established to give optimized measurement for different scenarios.

The receive node measures the channel between the transmit node and receiver node, and then selects one subset based on the channel measurement, e.g. the subset is chosen to provide the highest average CQI as described above. The selected subset is reported or signalled to the transmit node, and the transmit node will use all the precoding matrices or vectors defined in this subset for transmission according to an embodiment of the invention.

Alternatively, the transmit node may directly determine the selected subset of precoding matrices and signals the determined selected subset to the receive node for using (e.g. in DL, eNB knows the antenna configuration and selects the preferred subset optimized for the antenna configuration), or the receive node reports the channel measurement information to the transmit node, and the transmit node selects one subset according to the reported channel information from the receive node and signals the selected subset to the same.

The predefined M number of subsets is suitable for different scenarios, e.g. ULA and cross-polarization, or antenna gain imbalance and no antenna gain imbalance, or any combination of them, etc. In this way, the open loop precoding will be more robust to mobility and other different scenarios. In the case of mobility, open loop precoding over subsets is more robust as one can achieve the appropriate average CQI over channel.

For Rel-10 uplink 2TX rank-1 codebook, there are 6 precoding vectors used for close loop precoding, which are included in Table 2.

TABLE 2

2TX rank-1 precoding vectors

2TX rank-1 $\quad \frac{1}{\sqrt{2}}\begin{pmatrix}1\\1\end{pmatrix}, \frac{1}{\sqrt{2}}\begin{pmatrix}1\\-1\end{pmatrix}, \frac{1}{\sqrt{2}}\begin{pmatrix}1\\j\end{pmatrix}, \frac{1}{\sqrt{2}}\begin{pmatrix}1\\-j\end{pmatrix}, \frac{1}{\sqrt{2}}\begin{pmatrix}1\\0\end{pmatrix}, \frac{1}{\sqrt{2}}\begin{pmatrix}0\\1\end{pmatrix}$ For open loop precoding, six subsets of precoding vectors are defined and the elements from each subset are from Table 2. The predefined six subsets are shown with subset index in Table 3.

TABLE 3

Six subsets of precoding vectors

| Subset Index | Precoding vectors |
|---|---|
| 1 | $\frac{1}{\sqrt{2}}\begin{pmatrix}1\\1\end{pmatrix}, \frac{1}{\sqrt{2}}\begin{pmatrix}1\\j\end{pmatrix}, \frac{1}{\sqrt{2}}\begin{pmatrix}1\\-j\end{pmatrix}$ |
| 2 | $\frac{1}{\sqrt{2}}\begin{pmatrix}1\\-1\end{pmatrix}, \frac{1}{\sqrt{2}}\begin{pmatrix}1\\j\end{pmatrix}, \frac{1}{\sqrt{2}}\begin{pmatrix}1\\-j\end{pmatrix}$ |
| 3 | $\frac{1}{\sqrt{2}}\begin{pmatrix}1\\j\end{pmatrix}, \frac{1}{\sqrt{2}}\begin{pmatrix}1\\1\end{pmatrix}, \frac{1}{\sqrt{2}}\begin{pmatrix}1\\-1\end{pmatrix}$ |
| 4 | $\frac{1}{\sqrt{2}}\begin{pmatrix}1\\-j\end{pmatrix}, \frac{1}{\sqrt{2}}\begin{pmatrix}1\\1\end{pmatrix}, \frac{1}{\sqrt{2}}\begin{pmatrix}1\\-1\end{pmatrix}$ |

TABLE 3-continued

Six subsets of precoding vectors

| Subset Index | Precoding vectors |
|---|---|
| 5 | $\frac{1}{\sqrt{2}}\begin{pmatrix}1\\0\end{pmatrix}$ |
| 6 | $\frac{1}{\sqrt{2}}\begin{pmatrix}0\\1\end{pmatrix}$ |

Subset 5 and 6 in Table 3 are for different cases of antenna gain imbalance, and the remaining 4 subsets correspond to the case without antenna gain imbalance. For subset 1 ~4, there are three precoding vectors in each subset, and the second and third precoding vectors in each subset have high correlation with the first precoding vector. The principle of such a subset generation can be summarized as following.

Indeed, it can be assumed that the channel at time t (measurement timing) still has correlation with the channel at time T (transmission timing) even at high mobility and it will remain close to the channel at time t. Hence, when the first precoding vector in one subset is selected at time t, the possible precoding vector at time T would be changed to either the second or third precoding vector in this subset due to the channel correlation. To achieve robust CQI, the three precoding vectors can be used simultaneously to achieve appropriate average CQI.

It is worth mentioning that the first precoder in each defined subset has been chosen as the precoder which maximize the capacity or throughput or SINR at measuring time t.

The same principle can also be applied for higher rank transmissions. For higher ranks, the chordal distance can e.g. be used as a metric to group precoding matrices into each subset. Chordal distance is defined as the following:

$$d_{Chordal} = \frac{1}{\sqrt{2}}\|W_i W_i^H - W_j W_j^H\|_F$$

Where $W_i$ presents one precoding matrix and $\|\cdot\|_F$ denotes frobenius norm.

For example, there are 16 precoding matrices for Rel-10 4TX rank-2 codebook which is shown in Table 4. The 16 precoding matrices can be grouped into four subsets and each subset has four matrices. Moreover, the chordal distance of any two elements in each subset is the same.

TABLE 4

4TX rank-2 precoding matrices

| 1~6 | $\frac{1}{2}\begin{bmatrix}1&0\\1&0\\0&1\\0&-j\end{bmatrix}, \frac{1}{2}\begin{bmatrix}1&0\\1&0\\0&1\\0&j\end{bmatrix}, \frac{1}{2}\begin{bmatrix}1&0\\-j&0\\0&1\\0&1\end{bmatrix}, \frac{1}{2}\begin{bmatrix}1&0\\-j&0\\0&1\\0&-1\end{bmatrix},$ |
| | $\frac{1}{2}\begin{bmatrix}1&0\\-1&0\\0&1\\0&-j\end{bmatrix}, \frac{1}{2}\begin{bmatrix}1&0\\-1&0\\0&1\\0&j\end{bmatrix}$ |

TABLE 4-continued

4TX rank-2 precoding matrices

| 7~12 | $\frac{1}{2}\begin{bmatrix}1&0\\j&0\\0&1\\0&1\end{bmatrix}, \frac{1}{2}\begin{bmatrix}1&0\\j&0\\0&1\\0&-1\end{bmatrix}, \frac{1}{2}\begin{bmatrix}1&0\\0&1\\1&0\\0&1\end{bmatrix}, \frac{1}{2}\begin{bmatrix}1&0\\0&1\\1&0\\0&-1\end{bmatrix},$ |
| | $\frac{1}{2}\begin{bmatrix}1&0\\0&1\\-1&0\\0&1\end{bmatrix}, \frac{1}{2}\begin{bmatrix}1&0\\0&1\\-1&0\\0&-1\end{bmatrix}$ |
| 13~16 | $\frac{1}{2}\begin{bmatrix}1&0\\0&1\\0&1\\1&0\end{bmatrix}, \frac{1}{2}\begin{bmatrix}1&0\\0&1\\0&-1\\1&0\end{bmatrix}, \frac{1}{2}\begin{bmatrix}1&0\\0&1\\0&1\\-1&0\end{bmatrix}, \frac{1}{2}\begin{bmatrix}1&0\\0&1\\0&-1\\-1&0\end{bmatrix}$ |

TABLE 5

Four subsets of precoding matrices

| Subset Index | Precoding Matrices |
|---|---|
| 1<br>Chordal<br>distance = 0.5 | $\frac{1}{2}\begin{bmatrix}1&0\\1&0\\0&1\\0&-j\end{bmatrix}, \frac{1}{2}\begin{bmatrix}1&0\\1&0\\0&1\\0&j\end{bmatrix}, \frac{1}{2}\begin{bmatrix}1&0\\j&0\\0&1\\0&1\end{bmatrix}, \frac{1}{2}\begin{bmatrix}1&0\\-j&0\\0&1\\0&1\end{bmatrix}$ |
| 2<br>Chordal<br>distance = 0.5 | $\frac{1}{2}\begin{bmatrix}1&0\\-j&0\\0&1\\0&-1\end{bmatrix}, \frac{1}{2}\begin{bmatrix}1&0\\-1&0\\0&1\\0&-j\end{bmatrix}, \frac{1}{2}\begin{bmatrix}1&0\\-1&0\\0&1\\0&j\end{bmatrix}, \frac{1}{2}\begin{bmatrix}1&0\\j&0\\0&1\\0&-1\end{bmatrix}$ |
| 3<br>Chordal<br>distance = 0.5 | $\frac{1}{2}\begin{bmatrix}1&0\\0&1\\1&0\\0&1\end{bmatrix}, \frac{1}{2}\begin{bmatrix}1&0\\0&1\\0&1\\1&0\end{bmatrix}, \frac{1}{2}\begin{bmatrix}1&0\\0&1\\-1&0\\0&1\end{bmatrix}, \frac{1}{2}\begin{bmatrix}1&0\\0&1\\0&1\\-1&0\end{bmatrix}$ |
| 4<br>Chordal<br>distance = 0.5 | $\frac{1}{2}\begin{bmatrix}1&0\\0&1\\1&0\\0&-1\end{bmatrix}, \frac{1}{2}\begin{bmatrix}1&0\\0&1\\0&-1\\1&0\end{bmatrix}, \frac{1}{2}\begin{bmatrix}1&0\\0&1\\-1&0\\0&-1\end{bmatrix}, \frac{1}{2}\begin{bmatrix}1&0\\0&1\\0&-1\\-1&0\end{bmatrix}$ |

It should be noted that all the precoding vectors/matrices are allocated to several subsets in this embodiment, but it is not restricted that only part of the precoding vectors/matrices in the codebook is used to form subsets. As the transmission rank between the transmit node and receive node is adaptively changed according to the channel, i.e. rank adaptation, the transmission rank can be any value between 1 and R which is the maximum available transmission rank between the transmit node and receive node. It should also be noted that it is not restricted to define at least two subsets for only part of transmission rank, e.g. there are six subsets defined for rank-1 and there is only one subset of rank-2 in case of 2 antennas.

It is worth mentioning that other type of criterion such as other type of distances or projections can be used as metrics to create subsets such as two-norm distance or Fubini-Study distance, or the precoding matrices designed for the same antenna setup can be grouped into one subset.

Signalling Aspects of the Invention

The selected subset of precoding matrices shall be signalled or reported to the transmit node for precoding operation according to an embodiment of the invention. The signalling of the subset can preferably be performed semi-statically or dynamically.

For instance, assuming that there are two subsets for ULA and cross-polarization, respectively, for DL transmission; once the antenna configuration in a cell is identified, the selected subset will not be changed until moving to a new cell. For this case, it is preferred to configuring the subset semi-statically, e.g. by Radio Resource Control (RRC) signalling to reduce signalling overhead. When a certain subset is configured, the receive node only needs to report the transmission rank and/or CQI (or MCS) to the transmit node and also the computation complexity to select the subset is reduced. Once the transmission rank is received by the transmit node, it knows the set of precoding matrices to be used for transmission with such rank.

In addition, the selected subset can be signalled dynamically on e.g. a Physical Downlink Control Channel (PDCCH) when the transmitter is a UE, or on a Physical Uplink Control Channel (PUCCH) when the transmitter is a eNB. For dynamic signalling, a subset index can be explicitly signalled by a number of information/signalling bits or implicitly by selected Precoding Matrix Index (PMI).

In LTE Rel-10 uplink, the PMI and transmission rank are jointly encoded and signalled on PDCCH by 3 bits (2TX) and 6 bits (4TX). Thus, this signalling format can be reused to indicate the selected subset. As there is at least one precoding matrix/vector in each subset, the subset can be represented by one of precoding vectors/matrices belonging to the subset. For example, there are six subsets of precoding matrices in Table 3 and the first precoding vector from each subset is unique and can represent the subset, which means that the first precoding vector is associated with the specific subset. When the PMI corresponding to a certain precoding vector is signalled to the UE on PDCCH, the UE will search the first precoding vector of which subset is same as the signalled one, and then decide the subset.

A further example, with reference to Table 5, in which there are 4 subsets and each precoding matrix only belongs to one subset. Thus any precoding matrix in one subset can represent this specific subset. When a subset is selected, the PMI corresponding to any one of precoding matrix in the subset can be signalled on PDCCH as in Rel-10. The only difference is that the UE needs to associate the PMI with the subset and not with a particular precoding matrix.

Without loss of generality, the explicit or implicit subset signalling schemes as described above can also be applied for DL transmission, e.g. eNB semi-statically signals the determined subset to the UE, and the UE will calculate the CQI based on the precoding matrices in the determined subset; or the UE reports the subset information to the eNB on PUCCH, or the eNB signals which subset is used for transmission on PDCCH in case of using common reference signal.

Cycling Procedures Through Subset Precoding Matrices

After the transmit node obtains the subset information, the transmit node needs to utilize all the precoding vectors/matrices in the subset for achieving average CQI according to an embodiment of the invention. One way is to use large delay CDD with precoding cycling using all the predefined precoders in one subset which is the case in LTE-Rel8. Another solution is to only cycle through all the precoding matrices in the signalled selected subset, and the cycling granularity can be every N1 (N1>=1) resource elements/symbols/slots. For uplink transmission requiring single carrier property, it is desirable to cycle the precoding matrices every N1 symbols or slots. For example, the subset 2 (precoding vectors include w1, w2, w3) in Table 3 is used in one sub-frame. There are two slots in one sub-frame, and each slot consists of seven symbols. The middle symbol in each slot is used for demodulation reference signal, and the remaining six symbols are used for data. The transmission using precoding cycling is shown in FIG. 2.

Performance Results

The performance of uplink 2TX-2RX rank-1 using Table 3 has been evaluated and compared with 2TX rank-1 closed loop precoding using Table 2 at 60 km/h. From the six predefined subsets of Table 3 only the first four subsets presenting the case where antenna gain imbalance is not existing have been simulated. Cross-polarized antenna with zero correlation between them has been considered.

Figure 2:
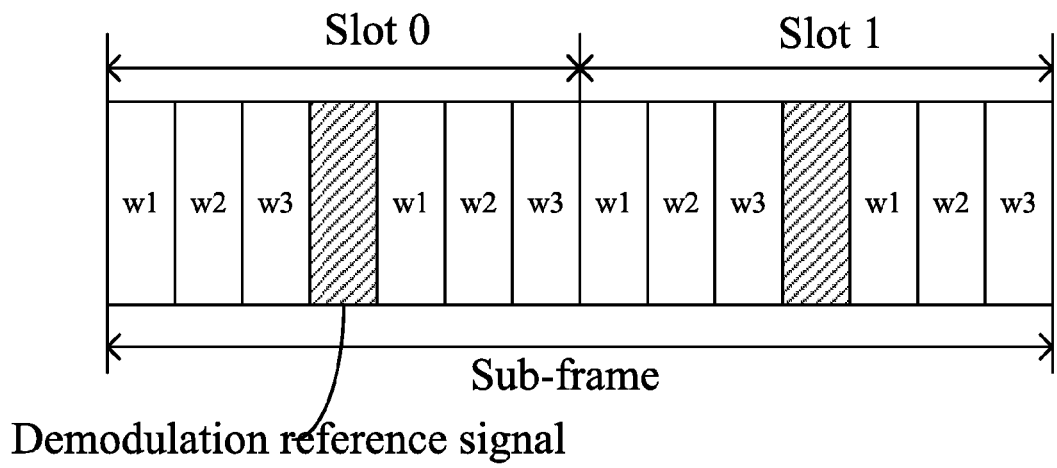
FIG. 2 shows an example of precoding cycling.
Figure 3:
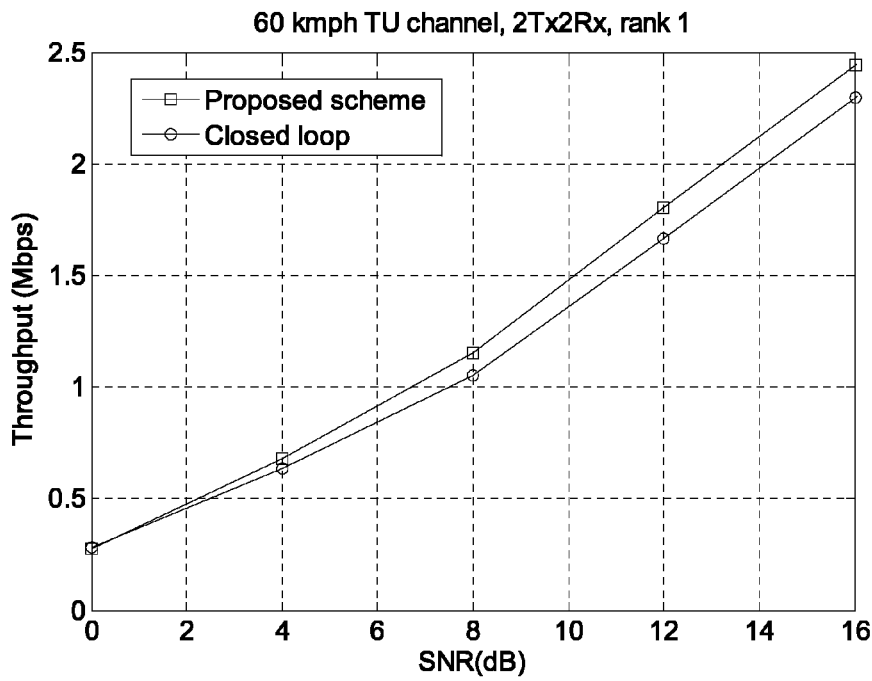
FIG. 3 shows simulation results for the present invention compared to closed loop precoding.
Figure 4:
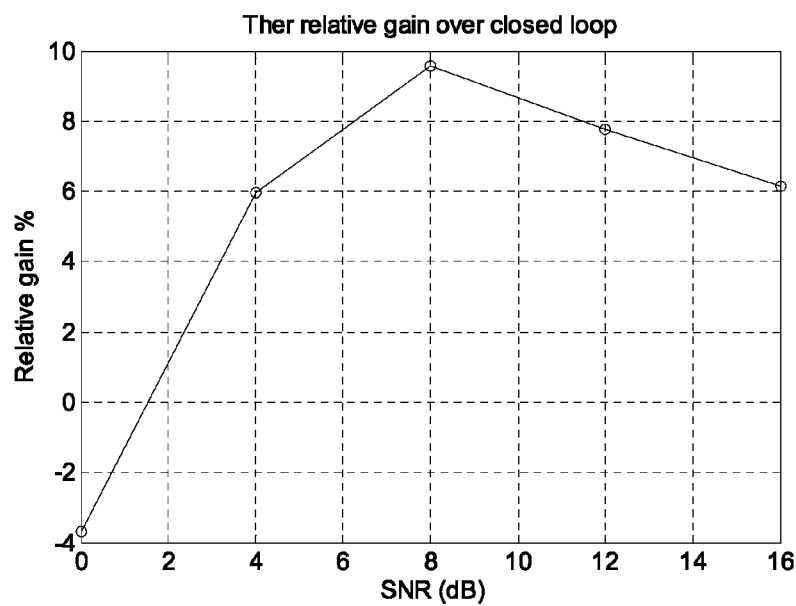
FIG. 4 shows the relative gain with the present invention compared to the closed loop precoding.

In the evaluation, the precoding cycling over different symbols as FIG. 2 has been used. The evaluation results are shown in FIG. 3 and the relative gain over close loop precoding is shown in FIG. 4. Closed loop precoding simulation results are based on the fact that only instantaneous SINR is provided and one precoding matrix is selected. It can be observed that the invention can provide up to 10% gain over closed loop precoding for this scenario.

Furthermore, the invention also relates to a method in a receive node and a method in a transmit node for a multiple antenna wireless communication system.

The method in a receive node comprises the following steps. Signalling at least one first transmission rank r to a transmit node, where $1 \leq r \leq R$, wherein R is a maximum available rank for a transmission between the transmit node and the receive node, and wherein at least one predefined precoding matrix corresponds to the first transmission rank r.

Defining at least two subsets of precoding matrices for at least one of the at least one first transmission rank r. Selecting one of the at least two subsets of precoding matrices based on a channel quality estimate for a radio channel between the transmit node and the receive node. Signalling the selected one subset of precoding matrices to the transmit node, wherein the selected one subset of precoding matrices is associated with the at least one predefined precoding matrix corresponding to the at least one first transmission rank r.

The method in a receive node can e.g. be applied by eNB in case of UL transmission according to an embodiment of the invention. For UL transmission, the receive node (i.e. the eNB) determines the transmission rank, selects one subset of precoding matrix corresponding to the transmission rank based on UL channel measurement from sounding reference signal, and thereafter signals the transmission rank and selected subset of precoding matrix to the transmit node (i.e. UE). The transmit node will perform UL transmission using the recommendation from eNB.

The method in a transmit node comprises the following steps. Receiving at least one first transmission rank r signalled from a receive node, where $1 \leq r \leq R$, wherein R is a maximum available rank for a transmission between the transmit node and the receive node, and wherein at least one predefined precoding matrix corresponds to the first transmission rank r. Determining by the transmit node a second transmission rank r' for transmitting data from the transmit node to the receive node, where $1 \leq r' \leq R$.

Defining at least two subsets of precoding matrices for at least one of the at least one first transmission rank r. Selecting one of the at least two subsets of precoding matrices based on a channel quality estimate for a radio channel between the transmit node and the receive node. Signalling the selected one subset of precoding matrices to the receive node, wherein the selected one subset of precoding matrices is associated with the at least one predefined precoding matrix corresponding to the at least one first transmission rank r.

The method in a transmit node can e.g. be applied by eNB as well in case of DL transmission according to an embodiment of the invention. For DL transmission, the transmit node (i.e. the eNB) receives the signalled transmission rank from the receive node (i.e. UE). It should however be noted that the received transmission rank r is only a recommendation for DL transmission, and the eNB can override the received transmission rank r and instead use transmission rank r' for DL transmission. In addition, the transmit node determines the subset of precoding matrices for different transmission ranks based on the reported DL channel measurement information from the receive node, and signals the determined subset to the receive node.

The method in a receive node and transmit node according to the invention may further be modified according to the relevant embodiments of the method in a wireless communication system disclosed in the present application.

Moreover, as understood by the person skilled in the art, a method according to the invention may also be implemented in a computer program, having code means, which when run in a computer causes the computer to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

The invention relates further to a receive node device and a transmit node device corresponding to the methods described above. It should also be noted that the receive node device and the transmit node device may be modified, mutatis mutandis, according to the different embodiments of the method in a receive node and transmit node described above.

Finally, it should be understood that the present invention is not limited to the embodiments described above, but also relates to and incorporates all embodiments within the scope of the appended independent claims.

What is claimed is:

1. A method in a multiple antenna wireless communication system, said wireless communication system comprising at least one transmit node and at least one receive node, said method comprising:
    signalling by said receive node at least one first transmission rank r to said transmit node, where $1 \leq r \leq R$, wherein R is a maximum available rank for a transmission between said transmit node and said receive node, and wherein at least one predefined precoding matrix corresponds to said first transmission rank r;
    determining by said transmit node a second transmission rank r' for transmitting data from said transmit node to said receive node, where $1 \leq r' \leq R$;
    defining at least two subsets of precoding matrices for at least one of said at least one first transmission rank r;
    selecting one of said at least two subsets of precoding matrices in accordance with a channel quality estimate for a radio channel between said transmit node and said receive node; and
    signalling said selected one subset of precoding matrices, wherein said selected one subset of precoding matrices is associated with said at least one predefined precoding matrix corresponding to said at least one first transmission rank r.

2. The method according to claim 1, further comprising:
    precoding said data using said selected one subset of precoding matrices; and
    transmitting said precoded data from said transmit node to said receive node.

3. The method according to claim 2, wherein said step of precoding further comprises:
    precoding said data using precoding cycling.

4. The method according to claim 2, wherein said step of precoding further comprises:
    precoding said data using large delay cyclic delay diversity (CDD).

5. The method according to claim 1, wherein said channel quality estimate is a channel quality indicator (CQI) or signal to interference and noise ratio (SINR) for said radio channel.

6. The method according to claim 5, wherein said step of selecting further comprises:
    selecting said one subset such that an average channel quality indicator (CQI) or signal to interference and noise ratio (SINR) for said selected one subset of precoding matrices is higher than an average channel quality indicator (CQI) or signal to interference and noise ratio (SINR) for the other subset of precoding matrices.

7. The method according to claim 1, wherein at least one of said at least two subsets of precoding matrices comprises at least two precoding matrices.

8. The method according to claim 7, wherein the other subset of said at least two subsets of precoding matrices comprises at least one precoding matrix.

9. The method according to claim 1, wherein said at least two subsets of precoding matrices are determined in accordance with one or more criteria in the group comprising: antenna setup at said transmit node, antenna gain imbalance, and matrix distance metric.

10. The method according to claim 1, wherein said signalling is performed semi-statically.

11. The method according to claim 10, wherein said signalling is performed explicitly by using signalling bits.

12. The method according to claim 10, wherein said signalling is performed in a downlink.

13. The method according to claim 10, wherein said signalling is performed in an uplink.

14. The method according to claim 1, wherein said signalling is performed dynamically.

15. The method according to claim 14, wherein said signalling is performed implicitly by indicating a precoding matrix associated with said selected one subset of precoding matrices.

16. The method according to claim 1, wherein said second transmission rank r' always is equal to said at least one first transmission rank r.

17. The method according to claim 1, wherein said second transmission rank r' is different from said at least one first transmission rank r.

18. A method in a receive node for a multiple antenna wireless communication system, said method comprising:
    signalling at least one first transmission rank r to a transmit node, where $1 \leq r \leq R$, wherein R is a maximum available rank for a transmission between said transmit node and said receive node, and wherein at least one predefined precoding matrix corresponds to said first transmission rank r;
    defining at least two subsets of precoding matrices for at least one of said at least one first transmission rank r;
    selecting one of said at least two subsets of precoding matrices in accordance with a channel quality estimate for a radio channel between said transmit node and said receive node; and
    signalling said selected one subset of precoding matrices to said transmit node, wherein said selected one subset of precoding matrices is associated with said at least one predefined precoding matrix corresponding to said at least one first transmission rank r.

19. A method in a transmit node for a multiple antenna wireless communication system, said method comprising:

receiving at least one first transmission rank r signalled from a receive node, where $1 \leq r \leq R$, wherein R is a maximum available rank for a transmission between said transmit node and said receive node, and wherein at least one predefined precoding matrix corresponds to said first transmission rank r;

determining by said transmit node a second transmission rank r' for transmitting data from said transmit node to said receive node, where $1 \leq r' \leq R$, defining at least two subsets of precoding matrices for at least one of said at least one first transmission rank r;

selecting one of said at least two subsets of precoding matrices in accordance with a channel quality estimate for a radio channel between said transmit node and said receive node; and signalling said selected one subset of precoding matrices to said receive node, wherein said selected one subset of precoding matrices is associated with said at least one predefined precoding matrix corresponding to said at least one first transmission rank r.

20. A receive node device for a multiple antenna wireless communication system, said receive node device being adapted to:

signal at least one first transmission rank r to a transmit node device, where $1 < r < R$, wherein R is a maximum available rank for a transmission between said transmit node device and said receive node device, and wherein at least one predefined precoding matrix corresponds to said first transmission rank r;

define at least two subsets of precoding matrices for at least one of said at least one first transmission rank r;

select one of said at least two subsets of precoding matrices in accordance with a channel quality estimate for a radio channel between said transmit node device and said receive node device; and signal said selected one subset of precoding matrices to said transmit node device, wherein said selected one subset of precoding matrices is associated with said at least one predefined precoding matrix corresponding to said at least one first transmission rank r.

21. A transmit node device for a multiple antenna wireless communication system, said transmit node device being adapted to:

receive at least one first transmission rank r signalled from a receive node device, where $1 \leq r \leq R$, wherein R is a maximum available rank for a transmission between said transmit node device and said receive node device, and wherein at least one predefined precoding matrix corresponds to said first transmission rank r;

determine by said transmit node a second transmission rank r' for transmitting data from said transmit node device to said receive node, where $1 \leq r' \leq R$, define at least two subsets of precoding matrices for at least one of said at least one first transmission rank r;

select one of said at least two subsets of precoding matrices in accordance with a channel quality estimate for a radio channel between said transmit node device and said receive node device; and signal said selected one subset of precoding matrices to said receive node device, wherein said selected one subset of precoding matrices is associated with said at least one predefined precoding matrix corresponding to said at least one first transmission rank r.

* * * * *

UNITED STATES PATENT AND TRADEMARK OFFICE
CERTIFICATE OF CORRECTION

PATENT NO. : 9,008,209 B2  
APPLICATION NO. : 14/042429  
DATED : April 14, 2015  
INVENTOR(S) : Jianghua Liu et al.

Page 1 of 1

It is certified that error appears in the above-identified patent and that said Letters Patent is hereby corrected as shown below:

In the Claims

In Col. 15, line 31, claim 20, delete "1<r<R," and insert -- $1 \leq r \leq R$, --.

Signed and Sealed this  
First Day of September, 2015

Michelle K. Lee  
*Director of the United States Patent and Trademark Office*